United States Patent
Sathe et al.

(10) Patent No.: US 12,280,331 B2
(45) Date of Patent: Apr. 22, 2025

(54) LOW RESIDENCE TIME GAS SEPARATOR

(71) Applicant: LanzaTech, Inc., Skokie, IL (US)

(72) Inventors: Mayur Sathe, Skokie, IL (US); Robert John Conrado, Washington, DC (US); Joss Anton Coombes, Chicago, IL (US); Gregory Joseph Morin, Chicago, IL (US); Brian Nelson Horton, Vidalia, GA (US); Curtis Paul Studebaker, Edmonton (CA)

(73) Assignee: LanzaTech, Inc., Skokie, IL (US)

( * ) Notice: Subject to any disclaimer, the term of this patent is extended or adjusted under 35 U.S.C. 154(b) by 283 days.

(21) Appl. No.: 17/661,523

(22) Filed: Apr. 29, 2022

(65) Prior Publication Data
US 2023/0347286 A1 Nov. 2, 2023

(51) Int. Cl.
*B01D 53/78* (2006.01)
*B01D 53/26* (2006.01)

(52) U.S. Cl.
CPC .............. *B01D 53/78* (2013.01); *B01D 53/26* (2013.01); *B01D 2257/504* (2013.01); *B01D 2258/05* (2013.01)

(58) Field of Classification Search
CPC ............ B01D 19/0021; B01D 19/0042; B01D 19/02; B01D 53/26; B01D 53/62; B01D 53/78; B01D 53/84
See application file for complete search history.

(56) References Cited

U.S. PATENT DOCUMENTS

| | | | |
|---|---|---|---|
| 6,138,378 A * | 10/2000 | Takashina | B01D 53/78 34/379 |
| 7,972,824 B2 | 7/2011 | Simpson | |
| 8,293,509 B2 | 10/2012 | Simpson | |
| 8,658,408 B2 | 2/2014 | Simpson | |
| 8,900,836 B2 | 12/2014 | Simpson | |
| 9,068,202 B2 | 6/2015 | Tran | |
| 9,284,564 B2 | 3/2016 | Mueller | |
| 9,327,251 B2 | 5/2016 | Li | |
| 9,347,076 B2 | 5/2016 | Liew | |
| 9,359,611 B2 | 6/2016 | Koepke | |
| 9,410,130 B2 | 8/2016 | Koepke | |
| 9,738,875 B2 | 8/2017 | Koepke | |

(Continued)

FOREIGN PATENT DOCUMENTS

| EP | 2243529 A1 | 10/2010 |
|---|---|---|
| JP | 2002506716 A | 3/2002 |

(Continued)

OTHER PUBLICATIONS

International Search Report and Written Opinion, issued in corresponding International Application No. PCT/US2023/018838, dated Aug. 8, 2023, 13 pages.

(Continued)

*Primary Examiner* — Sharon Pregler (57) ABSTRACT

The systems and methods disclosed herein provide for the efficient separation of gas from fluid comprising liquid. In particular, gas separator systems and methods for use in bioreactor systems and operations are disclosed herein providing an efficient means to remove gaseous waste products, unreacted gaseous substrates, and or inert gas from broth of the biological fermentation of carbon substrates using a microorganism biocatalyst.

8 Claims, 8 Drawing Sheets

(56) References Cited

U.S. PATENT DOCUMENTS

| | | | |
|---|---|---|---|
| 9,789,429 | B2 | 10/2017 | Schook |
| 9,890,384 | B2 | 2/2018 | Mueller |
| 9,994,878 | B2 | 6/2018 | Koepke |
| 10,167,218 | B2 | 1/2019 | St. John et al. |
| 10,174,303 | B2 | 1/2019 | Behrendorff |
| 10,590,406 | B2 | 3/2020 | Koepke |
| 10,913,958 | B2 | 2/2021 | Koepke |
| 2012/0045807 | A1 | 2/2012 | Simpson |
| 2013/0157322 | A1 | 6/2013 | Simpson |
| 2015/0353380 | A1 | 12/2015 | Profit et al. |
| 2019/0185888 | A1 | 6/2019 | Koepke |
| 2021/0087087 | A1 | 3/2021 | Pacheco-Ruiz et al. |
| 2021/0292732 | A1 | 9/2021 | Liew |
| 2023/0132594 | A1 | 5/2023 | Sathe et al. |
| 2023/0132925 | A1 | 5/2023 | Brenc et al. |

FOREIGN PATENT DOCUMENTS

| | | | |
|---|---|---|---|
| JP | 2003126631 | A | 5/2003 |
| JP | 2012206100 | A | 10/2012 |
| KR | 100797197 | B1 | 1/2008 |
| KR | 100848117 | B1 | 7/2008 |
| KR | 100871352 | B1 | 12/2008 |
| KR | 101334950 | B1 | 11/2013 |
| KR | 101455180 | B1 | 10/2014 |
| KR | 101654508 | B1 | 9/2016 |
| KR | 101710155 | B1 | 2/2017 |
| KR | 101722099 | B1 | 3/2017 |
| KR | 101758594 | B1 | 7/2017 |
| KR | 101844734 | B1 | 5/2018 |
| KR | 101936181 | B1 | 1/2019 |
| KR | 101979767 | B1 | 5/2019 |
| KR | 102049073 | B1 | 11/2019 |
| KR | 102052855 | B1 | 12/2019 |
| KR | 102085905 | B1 | 3/2020 |
| KR | 20200031792 | A | 3/2020 |
| TW | M250939 | U | 11/2004 |
| TW | I243205 | B | 11/2005 |
| TW | 202024314 | A | 7/2020 |
| WO | 2013003012 | A1 | 1/2013 |
| WO | 2018221970 | A2 | 12/2018 |
| WO | 2019122028 | A1 | 6/2019 |

OTHER PUBLICATIONS

AES Arabia Ltd. "Dissolved Air/Gas Flotation Separators" visited Jan. 21, 2021 at http://www.aesarabia.com/dissolved-air-gas-flotation-separators/.

Ecologix Environmental Systems "Dissolved Air Flotation" visited Jan. 21, 2021 at https://www.ecologixsystems.com/library-daf/.

K-Pack Systems Pvt Ltd., Wastewater Treatment Plant, visited Jan. 21, 2021 at https://www.exportersindia.com/kpacksystems/wastewater-treatment-plant-mumbai-india-1438311.htm.

Parkson Corporation "Lamella EcoFlow" visited Jan. 21, 2021 at https://www.parkson.com/products/lamella-ecoflow.

Sai Sankar Ganesan "Internals in Gas-Liquid Systems", LSU Digital Commons visited May 5, 2020 at (https://digitalcommons.lsu.edu).

Sulzer Chemtech "Liquid-Liquid Separation Technology", Published 2013, www.sulzer.com.

\* cited by examiner

LOW RESIDENCE TIME GAS SEPARATOR

FIELD

Embodiments described herein generally relate to systems for the separation of gas from a liquid. Other embodiments described herein generally related to methods for removing gases from liquids. In particular, gas separator systems and methods for use with bioreactors are disclosed herein providing an efficient means to separate gaseous waste products from the effluent of a process for biological fermentation of carbon substrates which are introduced into a liquid broth containing a microorganism culture.

BACKGROUND

Systems for the removal of gaseous or solid waste products from liquids generated during industrial processes are well-known. Biological and chemical reactor systems require small bubbles for better mass transfer, and biological systems with smaller size substrate bubbles have improved efficiency in the generation of useful products by biological fermentation. Smaller bubbles, however, have difficulty rising in liquids and require an extended period of time to disengage from liquids in known separator systems. As a result, conventional and known systems require large separator volumes to allow gases such as waste gases generated as byproducts in gas fermentation, inert gases, unused substrate gas, and the like, to rise to the surface of reaction fluids for eventual removal from the system. Typical gasses to be separated from a broth effluent of a gas fermentation bioreactor may include $CO_2$, CO, $H_2$. The broth effluent further contains system microorganism biocatalyst and liquid nutrient solution. Due to the size of the separator volume required to completely remove gases from the broth effluent of a gas fermentation bioreactor, for example, the system microorganism biocatalyst remains in the broth for an extended period of time without the needed biocatalyst gas substrate required for fermentation and sustainment of microbial life. As a result, the microorganism biocatalyst may prematurely lose viability and thus limit the efficiency of the overall fermentation reaction. Additionally, large separator volumes increase the footprint and amount of space required for the overall reactor and separator system increasing both component and operating costs. These limitations of known systems restrict the overall biocatalyst activity and restrict the generation of useful products. As such, there remains a need for a reduced volume gas separator to maximize biological fermentation reactions in bioreactors.

In addition, if waste gases are not removed from the broth effluent from gas fermentation bioreactors, the waste gases, such as inert gases, and or $CO_2$, will be recycled to the bioreactor with the broth. The inert gases and or $CO_2$ dilute the amount of new biocatalyst gas substrate that is capable of being incorporated into the recycled broth; new biocatalyst gas substrate that is needed to be available for fermentation by the microorganism biocatalyst. Further, to maximize fermentation by the microorganism biocatalyst, small size, fine size, or micro size substrate bubbles are generated by the reactor system, such as by increasing system superficial gas velocities. Residual inert gasses and or $CO_2$ not removed from the system and instead recycled in the broth, may expand within the reactor restricting superficial gas velocities and limiting the creation of small size, fine size, or micro size bubbles.

Accordingly, there is a need for systems and methods to efficiently remove small, fine, or micro size bubbles in biological and chemical reactor systems using a reduced volume gas separator. The gas separator systems and methods disclosed herein overcome the limitations conventional reactor and separator systems.

SUMMARY

The following presents a simplified summary of various embodiments described herein. This summary is not an extensive overview and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, embodiments described herein are directed to systems and methods for the efficient separation of gas from a liquid.

In one embodiment, the systems disclosed herein relate to separating gas from a liquid and may include a separator vessel, a fluid inlet engaged with the separator vessel, at least one gas outlet engaged with the separator vessel, at least one liquid outlet engaged with the separator vessel, a plurality of inclined plates positioned within the separator vessel, and a fluid distributor positioned within the separator vessel and engaged with the plurality of inclined plates. In some examples, the fluid distributor may also include a first end proximate to the fluid inlet, and a second end distal to the fluid inlet. The fluid distributor may be in physical contact with the fluid inlet. In other examples, the fluid distributor has a uniform width. In other examples, the first end of the fluid distributor may be wider than the second end. In another example, the fluid distributor may include a plurality of orifices positioned on at least two sides of the fluid distributor. The top, sides, and bottom of the fluid distributor may form a rectangular-shaped cross-section. In another example a plurality of fluid directing internals are positioned within the fluid distributor. In another example, the fluid distributor may include an upper portion positioned above a top of the plurality of inclined plates, and a lower portion positioned above a bottom portion of the plurality of inclined plates. In other examples, the separator vessel may be cylindrical, and the cylindrical separator vessel may be oriented in a horizontal plane. In yet another example, the cylindrical separator vessel may be positioned above at least a bottom one-third portion of a reaction vessel. In some examples, the plurality of inclined plates may have a spacing of about 25 mm to 200 mm between the individual plates. In another example, the plurality of inclined plates may be angled from about 45 degrees to about 80 degrees with respect to a horizontal axis. In another example, the inclined plates have bottom portions which engage a perforated plate.

In another aspect, the methods disclosed herein relate to separating gas from a liquid and may include feeding a fluid comprising liquid and gas into an inlet of a separator vessel, channeling the fluid into a fluid distributor within the separator vessel, directing the fluid within the fluid distributor and uniformly irrigating through orifices in the fluid distributor a plurality of inclined plates positioned within the separator vessel along a length of the fluid distributor; allowing the gas to rise against the plurality of inclined plates, draining the liquid through at least one liquid outlet, and removing the gas through at least one gas outlet. In one example the method involves irrigating the plurality of inclined plates with fluid via orifices positioned in the sides of the fluid distributor. In some examples, fluid flow within the fluid distributor is directed via fluid directing internals positioned within the fluid distributor. In other examples, the method may also include pressurizing the separator vessel, and the separator vessel may be cylindrical. In another example, the cylindrical separator vessel may be positioned in a horizontal plane. In some examples, the fluid distributor may include a plurality of orifices positioned on a bottom of the fluid distributor. In one example, the upper portion of the fluid distributor may be positioned above a top of the plurality of inclined plates, and the lower portion of the fluid distributor may be positioned above a bottom portion of the plurality of inclined plates. In yet another example, the method may also include irrigating the plurality of inclined plates with a first volume of fluid via the plurality of orifices positioned on the upper portion of the fluid distributor and irrigating the plurality of inclined plates with the second volume of fluid via the lower portion of the fluid distributor. In some examples, the first volume of fluid irrigating the plurality of inclined plates may include about 30% of a total liquid volume, and the second volume of fluid irrigating the plurality of inclined plates may include about 70% of the total liquid volume. In other examples, the method may include maintaining a constant cross-flow velocity and a constant bubble separation velocity across the plurality of inclined plates and may include recirculating the drained liquid in a closed system.

In still another aspect, the systems disclosed herein relate to a bioreactor system that comprises a reaction vessel and a gas separator vessel. In certain examples, the reaction vessel may comprise a fluid comprising a liquid growth medium, waste gas, substrate gas, and a culture of at least one microorganism. In some examples, the substrate gas may include at least one C1 carbon source. In another example, the culture of at least one microorganism may anaerobically or aerobically ferment the substrate gas to produce at least one fermentation product and the waste gas. The gas separator vessel is in fluid communication with the reaction vessel and operates to remove substrate gas and waste gas from the fermentation broth. In still other examples, the gas separator vessel is positioned above a bottom one-third portion of the reaction vessel. A fluid inlet of the gas separator vessel may be in fluid communication with the reaction vessel, at least one gas outlet of the gas separator vessel may be in fluid communication with the reaction vessel. At least one liquid growth medium outlet may be fluidly engaged with the separator vessel. The gas separator vessel may also include a plurality of inclined plates positioned within the separator vessel, and a fluid distributor positioned within the separator vessel to engage the plurality of inclined plates. In other examples the fluid distributor may contain fluid directing internals. In other examples, a pump may be configured to recirculate the liquid growth medium and the culture of at least one microorganism from the separator to the reaction vessel. In still other examples, the system may be pressurized, and the system may lack a throttling valve between the reaction vessel and the gas separator fluid inlet.

These features, along with many others, are discussed in greater detail below.

BRIEF DESCRIPTION OF THE DRAWINGS

A more complete understanding of embodiments described herein, and the advantages thereof may be acquired by referring to the following description in consideration of the accompanying drawings, in which like reference numbers indicate like features. Common well-understood elements that are useful or necessary in a commercially feasible embodiment are often not depicted in the drawings in order to facilitate a less obstructed view of these various embodiments of the present disclosure.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized, and structural and functional modifications may be made without departing from the scope of the described embodiments. Embodiments described herein are capable of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "engaged," "fluidly engaged," "coupled," "positioned," "configured," "oriented," and similar terms, is meant to include both direct and indirect mounting, connecting, coupling, positioning and engaging.

The systems and methods, as disclosed herein, relate to the efficient separation of gas from fluids comprising liquid by employing a reduced volume gas separator as compared to known conventional chemical and biological reactor systems. Gas separator is meant to include a unit for the separation of gas from fluid comprising liquid. In the example of a fermentation process, the fluid comprising liquid may comprise a mixture of gas, liquid, and a culture of microorganisms. In other examples, without a culture of microorganism, the gas separator may be a gas-liquid separator. In particular, the systems and methods for gas separator systems and use in bioreactor systems disclosed herein provide a superior means to remove small and or fine bubbles from a broth containing a microorganism culture. The broth containing a microorganism culture is referred to as a fluid or as a liquid. Small, fine, and or micro size bubbles have smaller diameters compared to bubbles generated by conventional reactor systems and spargers. The small, fine, and or micro size bubbles do not rise through the liquid or broth fast enough to sufficiently disengage from the liquid or broth within conventional separators in reactor systems. To allow for sufficient disengagement of the small, fine, and or micro size bubbles, the residence time of the broth in the separator would need to be extended which results result in microorganism biocatalyst in the broth lacking substrate for extended periods of time. The extended time microorganism biocatalyst spend in broth lacking a proper feed gas (substrate) may result in a quantity of no longer viable microbial biomass which can no longer contribute to the generation of product rendering an inefficient fermentation of desired reaction product. Therefore, a novel system is needed to expeditiously remove small, fine, and or micro bubbles since conventional separator systems require increased residence time and or separator volumes. The gas separator disclosed herein reduces required separator volume and recycles the broth back to the bioreactor vessel with reduced small, fine, and or micro bubbles in a shorter period of time promoting microorganism biocatalyst growth and survival. If the small, fine, or micro bubbles are not sufficiently removed from the broth, the small, fine, and or micro bubbles operate to dilute the overall mixture when substrate gas is introduced into the recycled fluid. The mixing of recycled bubbles and substrate gas would reduce the conversion efficiency of biocatalyst and limit the amount of useful product produced by the reaction. The general term separator is meant to include gas separator including a gas liquid separator.

The systems and methods, as disclosed herein, employ inclined plates within a gas separator vessel for the efficient separation of small, fine, and or micro bubbles from fluids comprising liquid such as fermentation broth. Conventional systems using inclined plate settlers or lamella settlers are used for the removal of fine particles in wastewater treatment different from lamella settlers. The inclined plates disclosed herein, however, are used to remove gas from a fluid comprising liquid which is in direct contrast to conventional lamella settlers which are intended for removing solid particles from liquids, mainly water. As such, the configuration of the components within the gas separator or separator vessel, as well as the position and configuration of the gas separator within a reactor system as a whole, differ significantly from conventional systems. For example, conventional lamella settlers have an open top portion and are typically operated at atmospheric pressure and fluids, or liquids typically enter the settlers from the bottom or a lower portion of the device. The separator disclosed herein, in contrast, has liquid and bubbles entering from a top portion of the separator vessel, and the liquid with the bubbles removed exit at a bottom portion of the vessel. The separator disclosed herein may be a closed and pressurized system. In other examples, the separator disclosed herein may be unpressurized. The gas separator disclosed herein may be used as part of a closed loop and pressurized bioreactor system for removing small, fine, and or micro bubbles of substrate, inert gases, and or other waste gases from a microbial fermentation broth effluent from a bioreactor. The gas at this stage of the system, post bioreactor, is often "spent gas" since the fermentation process has exhausted much or all of the substrate gas while the system microorganism biocatalyst may have generated waste gases. Inert gas may also be present. Inert gas may have been part of the feed gas to the bioreactor, the feed gas having the substrate gas in a mixture with inert gas. The inert gas, remaining unconsumed in the fermentation, exits the bioreactor in the effluent.

By removing unused substrate gas from the bioreactor effluent broth in the separator, the microorganism biocatalyst faces scarcity of substrate gas during the time the microorganisms are present in the separator. Due to the lower amount of gas substrate available to the microorganism biocatalyst while in the separator, it is desirable to minimize the volume of the separator and thus minimize the amount of time the microorganisms remain in a fermentation broth lacking adequate gas substrate resulting in the accumulation of no longer viable microbial biomass. Reducing the separator volume, however, presents challenges for small, fine, and or micro scale bubbles which, due to their smaller size, rise more slowly through liquid as compared to larger scale bubbles. Accordingly, the required volume, such as the depth allowed for the bubbles to rise, and the length required from the inlet to the outlet within the vessel of a separator is higher for sub-millimeter scale microbubbles compared to conventional millimeter-scale bubble separators. In some examples, the bubbles present may have a diameter of about 2 mm to about 20 mm. In another example, the bubbles present the liquid may have a diameter of about 5 mm to about 15 mm, or from about 7 mm to about 13 mm. Small bubbles may have a diameter of from about 3 mm to about 8 mm or from about 5 mm to about 15 mm. Fine bubbles may have a diameter of about 0.1 mm to about 5 mm, or about 0.2 mm to about 1.5 mm. Micro bubbles may have a diameter of about 0.05 mm to about 0.1 mm or from about 0.075 mm to about 0.2 mm.

Further, the positioning of the gas separator, with respect to the bottom of the system reaction vessel, is another embodiment of the systems and methods disclosed herein. In certain embodiments, the gas separator may be mounted or positioned as high as possible relative to the reaction vessel. By elevating the separator to the maximum extent possible, the need for costly valving such as a butterfly valve or throttling valve, between the reaction vessel discharge and the gas separator inlet is eliminated. When a gas separator is positioned near to the bottom of a reaction vessel, without proper valving, system liquid such as fermentation broth may drain out of the reaction vessel, especially when the system is temporarily not in operation, such as during start-up procedures. In conventional systems, a throttling valve is required between the reaction vessel and the separator to control the flow of liquid during reactor start-up since otherwise the liquid may drained from the reaction vessel while the system is not operational. By decreasing the volume of the separator vessel, the weight of the gas-separator is similarly reduced, and the separator may be elevated and positioned at a level near to the central or upper portion of the reaction vessel. Elevating the gas separator eliminates the need for a throttling valve and significantly reduces system cost. Further, safety and reliability of the system are increased as a result of reducing the required number of reactor components and complexity. In certain embodiments, however, the throttling valve may be present to control the flow of fluid between the reaction vessel and the gas separator and to facilitate proper system start-up. Additionally, positioning the separator near the center portion or upper portion of the reaction vessel reduces the pressure differential between the separator and feed gas supply and injection point within the reaction vessel. As a result, the rate of dissolved $CO_2$ and other waste gases recycled within the reactor system may be reduced. Further, the elevated positioning of the separator provides an effective storage space for the broth during unsteady flow events and improves the overall operability and efficiency of the reactor.

Figure 1:
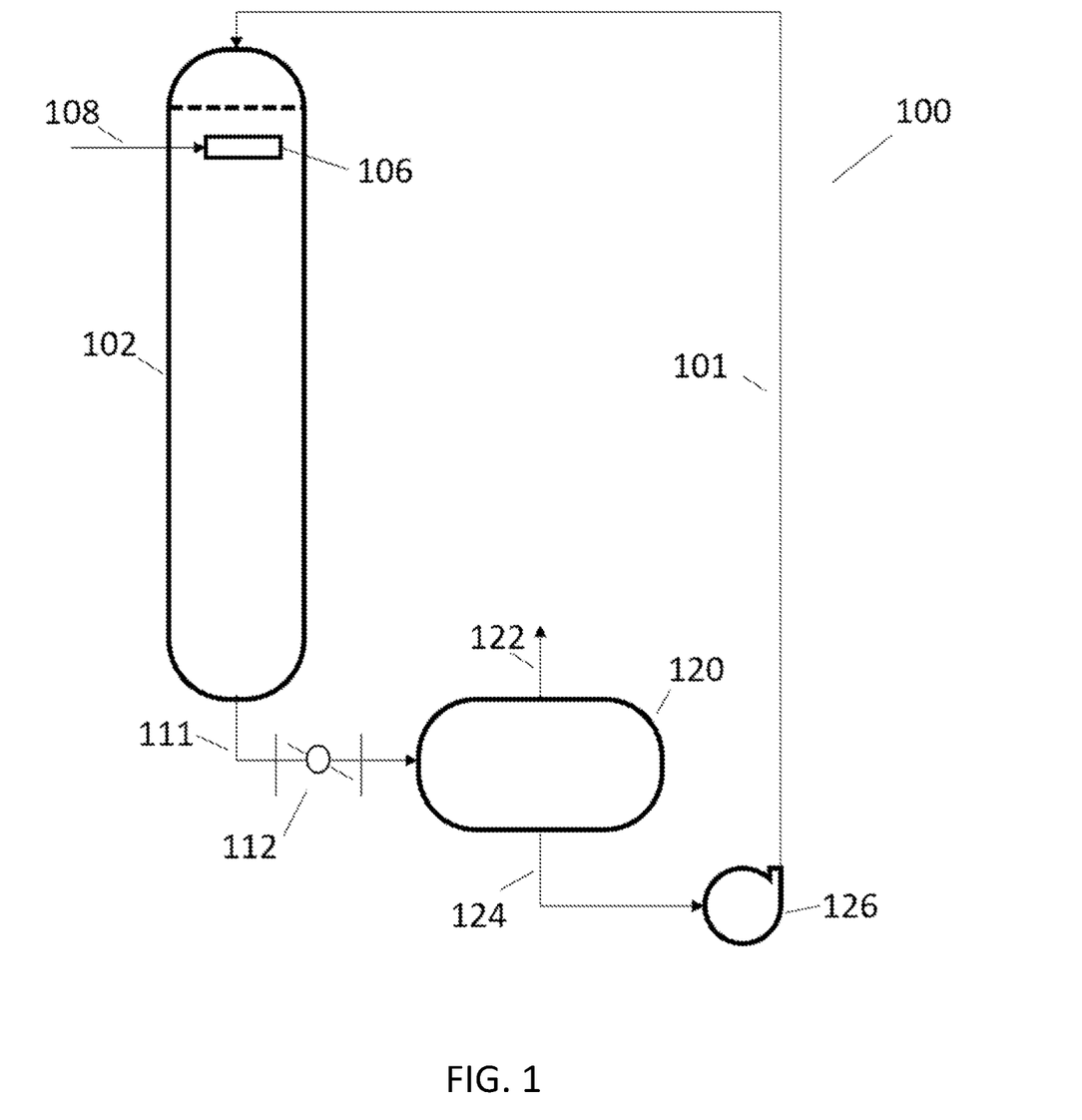
FIG. 1 schematically depicts a conventional bioreactor system with a conventional gas separator.

FIG. 1 schematically depicts a bioreactor system 100 with a conventional gas separator 120 positioned near the bottom of reaction vessel 102. Bioreactor system 100 typically includes a reaction vessel 102 configured to contain reactions such as a fermentation process or a chemical conversion process. Bioreactor system 100 may consist of one or more reaction vessels 102 and/or towers or piping arrangements. Suitable types of reaction vessels include, for example, continuous stirred tank reactor (CSTR), immobilized cell reactor (ICR), trickle bed reactor (TBR), upflow or downflow bubble columns, gas lift fermenter, static mixer, circulated loop reactor, membrane reactor, such as a hollow fiber membrane bioreactor (HFM BR) or other vessel or other device suitable for gas contact.

The bioreactor 100 may be adapted to receive a gaseous feed 108 comprising a gas substrate such as C1-carbon source injected into a liquid broth as bubbles by sparger 106. A C1-carbon source may refer to a one carbon-molecule that serves as a partial or sole carbon source for the microorganisms disclosed herein. For example, a C1-carbon source may comprise one or more of CO, $CO_2$, $CH_4$, $CH_3OH$, or $CH_2O_2$. In some examples, the C1-carbon source may comprise one or both of CO and $CO_2$. Optionally, hydrogen may also be introduced. A fermentation process may comprise a single reaction vessel 102 or multiple reactors, either in parallel or in series. For example, the fermentation process may comprise a first growth reactor in which the bacteria are cultured and a second fermentation reactor, to which fermentation broth from the growth reactor may be introduced and in which most of the fermentation products may be produced. Fermentation may be interpreted as the process that receives one or more gas substrates, such as syngas produced by gasification or an industrial waste gas, or $CO_2$ from direct air capture, and produces one or more products through the utilization of one or more C1-fixing microorganisms as biocatalyst. A C1-fixing microorganism may be a microorganism that has the ability to produce one or more products from a C1-carbon source. Typically, microorganisms in bioreactor 100 can be, or derived from, a C1-fixing bacterium such as *Acetobacterium woodii, Alkalibaculum bacchii, Blautia producta, Butyribacterium methylotrophicum, Clostridium aceticum, Clostridium autoethanogenum, Clostridium carboxidivorans, Clostridium coskatii, Clostridium drakei, Clostridium formicoaceticum, Clostridium ljungdahlii, Clostridium magnum, Clostridium scatologenes, Eubacterium limosum, Moorella the rmautotrophica, Moorella thermoacetica, Oxobacter pfennigii, Sporomusa ovata, Sporomusa silvacetica, Sporomusa spha-eroides, Clostridium necator, Cupriavidus necator, Thermoanaerobacter kivui, Moorella, Clostridium, Ruminococcus, Acetobacterium, Eubacterium, Butyribacterium, Oxobacter, Methanosarcina, Desulfotomaculum, Clostridium autoethanogenum, Clostridium ljungdahlii,* and *Clostridium ragsdalei* or combinations thereof.

The reaction vessel 102 may be a vessel or container in which one or more liquid streams or flows 101 may be introduced into the vessel 102 for subsequent gas contacting, gas-absorption, biological or chemical reaction, such as microbial fermentation. A fluid, as disclosed herein, may include liquid, bubbles including small, fine, and or micro bubbles, and/or waste gases. The fluid may also comprise the culture of one or more microorganisms. The fermentation broth or liquid 101 may encompass any mixture of components disclosed herein, for example, a nutrient media and a culture of one or more microorganisms. Again, the fermentation process may utilize the fermentation broth to ferment the bubbles of gas substrate to produce one or more products. The microbial culture may be maintained in the liquid broth which may also contain additional nutrients, vitamins, and/or minerals sufficient to permit growth of the microorganisms.

In reaction vessel 102, the fluid having both gas and liquid phases may flow in the vertical directions. In one embodiment in reaction vessel 102, the fluid of gas and liquid phases may flow generally downward within the vessel 102. The reaction vessel 102 may not be restricted to any specific aspect (height to diameter) ratio or restricted to any specific material and can be constructed from any material suitable to the process such as stainless steel or PVC. The reaction vessel 102 may contain internal components such as one or more static mixers that are common in biological and chemical engineering processing. The reaction vessel 102 may also consist of external or internal heating or cooling elements such as water jackets. The reaction vessel 102 may also be in fluid contact with a pump 126 to circulate liquid, bubbles, and/or fluid 101, 111, and 124 of the system 100.

As shown in FIG. 1, liquid broth 101 enters the top of the reaction vessel 120. Gas substrate in gas feed 108 is injected into the liquid 101 within the reaction vessel 102 through sparger(s) 106 connected to gas feed 108. Sparger 106 may comprise at least one device to introduce gas into the liquid, injected as bubbles, such as small bubbles, fine bubbles and or microbubbles, to agitate the gas or to dissolve the gas in the liquid. Example spargers may include orifice spargers, sintered spargers, and drilled pipe spargers. The sparger 106 may be mounted in a horizontal or a vertical position. In some examples, the sparger 106 may be a perforated plate or ring, sintered glass, sintered steel, porous rubber pipe, porous metal pipe, porous ceramic or stainless steel, etc. The sparger 106 may be of various grades (porosities) or may include certain sized orifices to produce a specific sized bubble. The injected gas substrate bubbles may be broken into smaller sized bubbles within the reaction vessel 102. Examples of systems and methods used to create bubbles include those described in U.S. Pat. No. 9,327,251, U.S. patent application Ser. No. 17/453,476 filed Nov. 3, 2021, and U.S. Patent Application No. 63/263,507 filed Nov. 2, 2021, all of which are incorporated herein by reference in their entirety for all purposes.

As also shown in FIG. 1, separator 120 is in fluid communication with reaction vessel 102. Fluid 111 containing gas bubbles, microorganisms, and liquid is discharged near the bottom of the reaction vessel 102 and controlled by throttling valve 112. The throttling valve 112 regulates the flow of fluid 111 into the separator 120. The separator 120 is configured to remove the substrate bubbles and waste gas including inert gas 122 from the fluid 111 and gas stream 122 exits or is vented from the separator 120. Waste gas may typically consist of inert gases and $CO_2$. The liquid or broth 124 with the gases removed is recirculated by pump 126 and re-enters the reaction vessel 102 as liquid 101. Liquid 101 may further comprise biocatalyst. Additional liquid broth may be combined with the recirculated broth 124 prior to entering the reaction vessel 120 upon recirculation.

Figure 2:
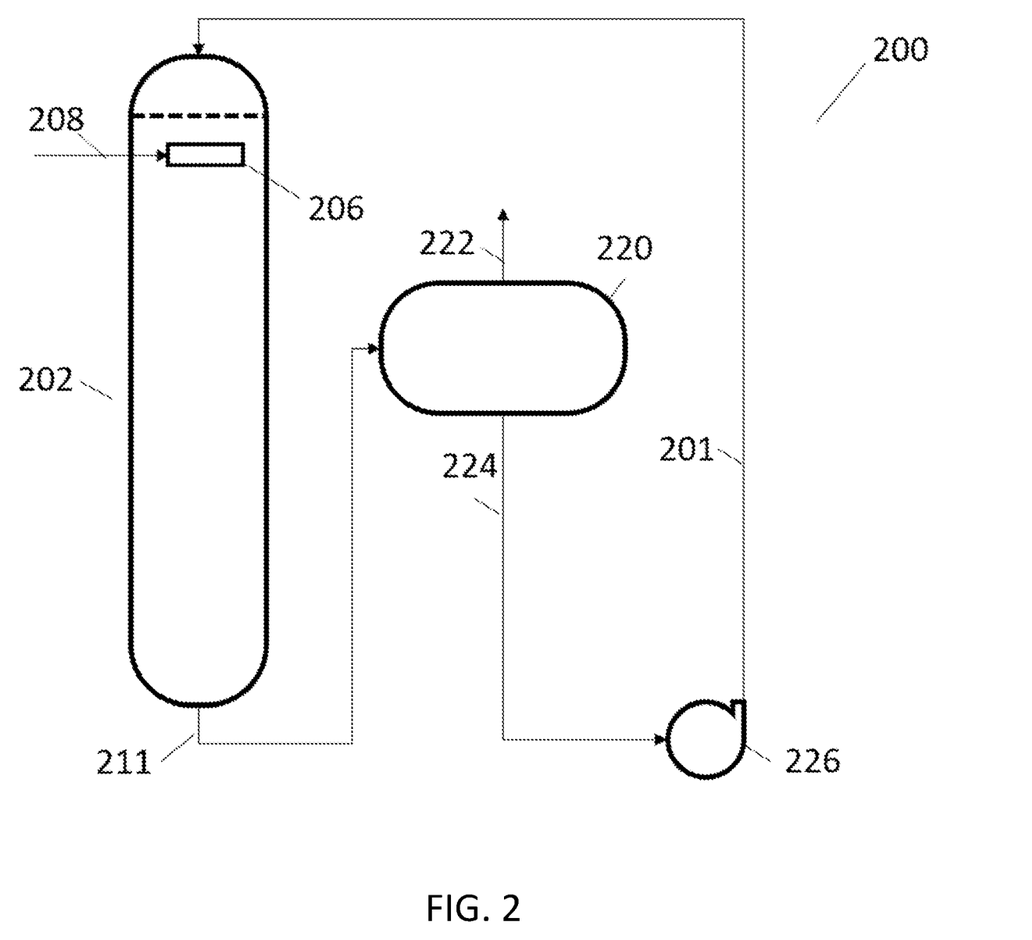
FIG. 2 schematically depicts a bioreactor system with a novel gas separator, according to the systems and methods disclosed herein.

FIG. 2 schematically depicts a bioreactor system 200 with a novel gas separator 220 positioned near the center or upper portion of reaction vessel 202. Liquid 201 such as broth enters the top of the reaction vessel 202. Gas feed 208 containing gas substrate is injected into liquid 201 within the reaction vessel 202 by sparger(s) 206 connected to gas feed 208. The gas substrate typically comprises a C1-carbon source injected into the liquid broth as bubbles in sizes from small, to fine, to micro by sparger 206. Gas separator 220 is in fluid communication with the reaction vessel 202. Fluid 211 containing bubbles of unused substrate and waste/inert gases, and liquid is discharged near the bottom of the reaction vessel 202. Fluid 211 may further comprise microorganism biocatalyst. Notably, system 200 lacks any throttling valve to regulate the flow of fluid 211 into separator 220. In other examples, however, a throttling valve may be present. System 200 does not require a throttling valve since the reduced volume separator 202 may be elevated to a central or upper portion of the reaction vessel 202 due to decreased size and weight. By elevating the separator 220, problems associated with start-up of the system and restricting the circulation of system liquid is eliminated. Again, the reduced volume separator provides a weight savings that allows the separator 220 to be elevated. Generally, the volume of the separator 220 required for the efficient and effective removal of gas may be at least 15% of the volume of the reaction vessel 202. In some examples, the volume required of the separator 220 may be, for example, at least, greater than, less than, equal to, or any number in between about 1, 2, 3, 4, 5, 6, 7, 8, 9, 10, 11, 12, 13, 14, 15, 16, 17, 18, 19, 20, 21, 22, 23, 24, 25, 26, 27, 28, 29 to 30% of the total volume of the reaction vessel 202.

Gas separator 220 may be configured to remove the gas bubbles, especially small, fine, and or micro size bubbles in gas stream 222 from the fluid 211. Gas stream 222 exits or is vented from a top portion of separator 220 via an outlet. Liquid stream 224 with waste/inert gas and substrate gas removed is recirculated by pump 226 and re-enters the reaction vessel 202 as liquid 201. Additional liquid may be combined with the recirculated liquid 224 prior to entering reaction vessel 202 upon recirculation by recycle pump 226. As previously discussed, positioning separator 220 near the center portion, upper portion, or top of reaction vessel 202 reduces the pressure differential between separator 220 and gas feed 208 and sparger 206 within reaction vessel 202. In other examples, separator 220 may be positioned at a general midpoint of reaction vessel 202 as measured from the bottom of the reaction vessel 202 to the top of the reaction vessel 202. In another example, separator 220 may be positioned above at least a bottom one-third portion of reaction vessel 202. In yet another example, separator 220 may be positioned near the upper one-third portion of reaction vessel 202.

As previously discussed, systems employing conventional gas separators for the removal of waste/inert gases from the reaction liquid require separator vessels with increased volumes to provide smaller bubbles the adequate time required to disengage and exit a liquid. The increased volume includes separator cylinders or vessels with increased height and length requirements to allow for the slow smaller bubble rise velocities. The time needed for a bubble to disengage and exit a reaction fluid or liquid may be represented by the following equation:

$$t = \frac{y}{V^y}$$

Where t is the time required for bubbles to rise and exit the liquid, y is the height of the separator vessel, and $V^y$ is the bubble rise velocity. Notably, the bubble rise velocity $V^y$ is generally determined by the size of the bubbles and the viscosity of the liquid broth. The smaller the bubbles, the smaller the rise velocity $V^y$ and the longer time that is needed for the bubbles to exit the liquid. The length or width of the separator required may be represented by the following equation:

$$L = V_x \times t$$

Where L is the required length of the separator vessel, Vx is the distance the liquid with bubbles is distributed from the separator vessel inlet to the separator vessel outlet. Time t may be substituted to give the following expression:

$$L = V_x \times \frac{y}{V^y}$$

Thus, it is clear that with a generally constant bubble rise velocity $V^y$ for bubbles of bioreactor systems, conventional separator systems must employ separator vessels with increased volumes to allow the smaller bubbles adequate time to exit the liquid. As discussed above, the prolonged length of time spent in liquids lacking a supply of substrate may result in increased no longer viable microbial biomass and the required separator volume increases the size and space requirements of overall conventional reactor systems.

Figure 3:
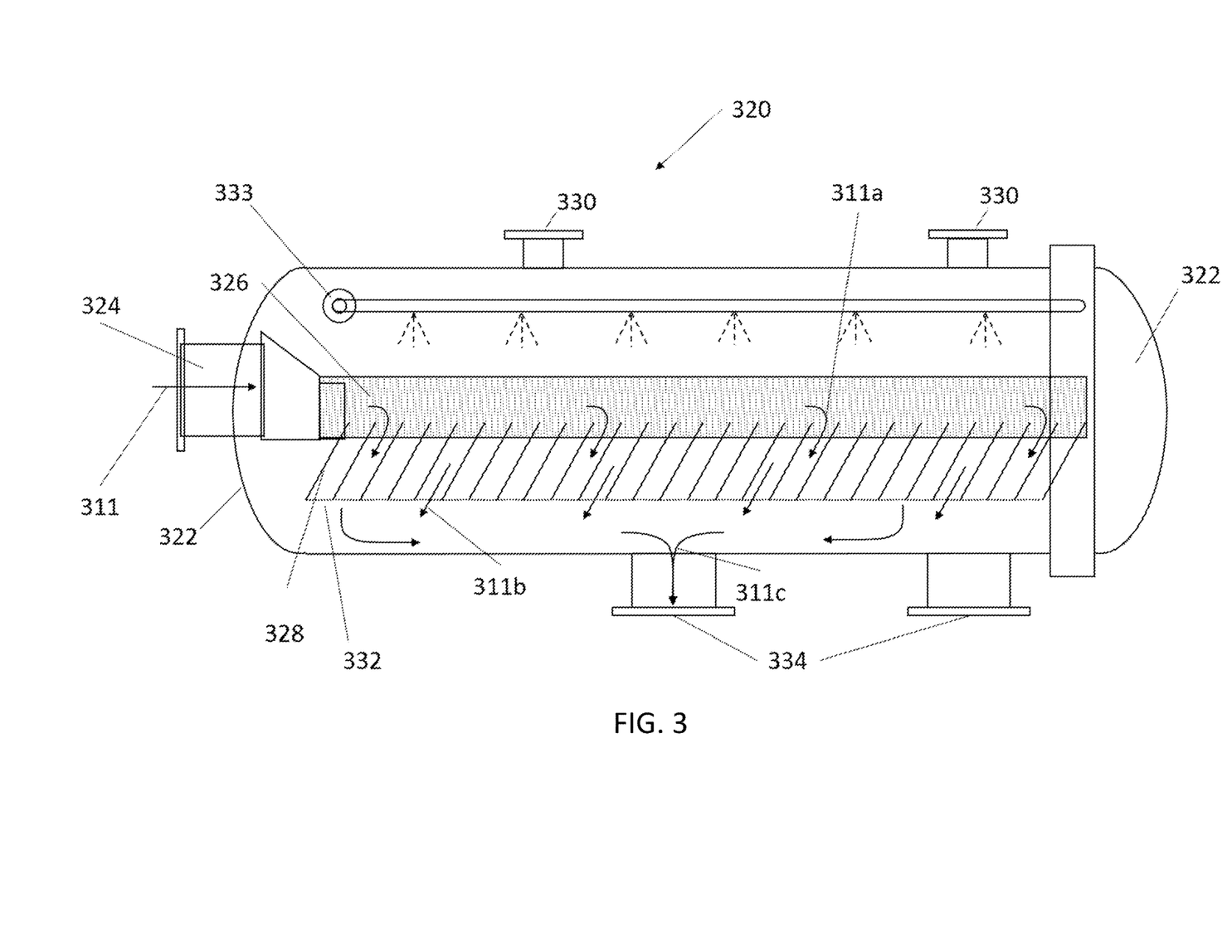
FIG. 3 illustrates a cross-sectional side view of an embodiment of the gas separator and the associated liquid fluid flow patterns, according to the systems and methods disclosed herein.

FIG. 3 illustrates a side cross-sectional view of the gas separator and the associated liquid-broth flow pattern of the novel gas separator 320 disclosed herein. The gas separator 320 may include fluid inlet 324 engaged with the separator vessel 322. Separator vessel 322 may be generally cylindrical-shaped. In other examples, the separator vessel 322 may be generally rectangular shaped. In certain examples, the separator vessel 322 may be positioned in a generally horizontal position. The separator vessel 322, alternatively, may be positioned in a generally vertical position. In some examples, the separator vessel 322 may be pressurized. In other examples, the separator vessel 322 is not pressurized. A fluid distributor 326 is positioned within separator vessel 320. Fluid distributor 326 is engaged with fluid inlet 324 as shown in FIG. 3 and is configured to distribute system fluid across the plurality of inclined plates 328. Fluid distributor 326 may have a cross-section that is generally rectangular, square, or pentagonal shaped. In one specific embodiment, fluid distributor 326 has a cross-section that is generally rectangular. In another specific embodiment fluid distributor 326 has a cross-section that is generally square. In another specific embodiment the bottom of fluid distributor 326 may be V-shaped.

Fluid distributor 326 may have an open top or a closed top. In some embodiments, fluid distributor 326 may include a plurality of orifices in the sides of fluid distributor 326 to irrigate the plurality of inclined plates 328. In some examples, fluid distributor 326 may include a plurality of orifices positioned in the bottom of the fluid distributor 326 to irrigate the plurality of inclined plates 328. In other embodiments, the bottom of fluid distributor 326 has only a sufficient number of orifices to allow cleaning solution to drain, and not a sufficient number of orifices to irrigate the inclined plates. In some examples, fluid distributor 326 may include a plurality of orifices both in the sides of the fluid distributor 326 and in the bottom of fluid distributor 326 to irrigate the plurality of inclined plates 328. In certain examples, the orifices at the sides, bottom, or both of the fluid distributor 326 are configured to facilitate a clean in place (CIP) of the fluid distributor 326 to remove solid waste products. The orifices may allow the proper drainage of CIP fluid and particulate waste products during cleaning operations. In one embodiment, a perforated plate 332 connects to the lower portions of the inclined plates. Perforated plate 332 operates to retain inclined plates 328 in position. Perforated plate 332 may operate to retain inclined plates 328 in position for a uniform distribution of inclined plates along the length of the fluid distributor 326.

In one embodiment the width of fluid distributor 326 remains constant along the length of fluid distributor 326. In another embodiment, the width of fluid distributor 326 proximate fluid inlet 324 may be wider than the width of the end of fluid distributor 326 distal to fluid inlet 324. Configuring fluid distributor 326 with a wider end near fluid inlet 324 and a narrower end distal fluid inlet 324, the fluid distributor may operate to maintain a constant fluid velocity across the entire length of fluid distributor 326 as fluid exits the orifices in the bottom of fluid distributor 326, and as fluid flows exits the orifices in the sides of fluid distributor 326. Fluid distributor 326 may contain fluid directing internals as discussed below with reference to FIG. 5.

Separated gas is vented or exits separator vessel 322 at gas outlets 330. In one example, separator 320 includes at least one gas outlet 330. In certain examples, the separator 320 may further include a sprayer system 333 configured to distribute broth across a froth that may accumulate across a top portion of the separator as bubbles rise to the surface of the liquid. The liquid spray breaks the bubbles forming the froth to assist with gas exiting outlets 330. Separator 320 may include liquid outlet 334 in fluid communication with the separator vessel 322. In some examples, separator 320 may include at least two outlets 334.

Figure 4:
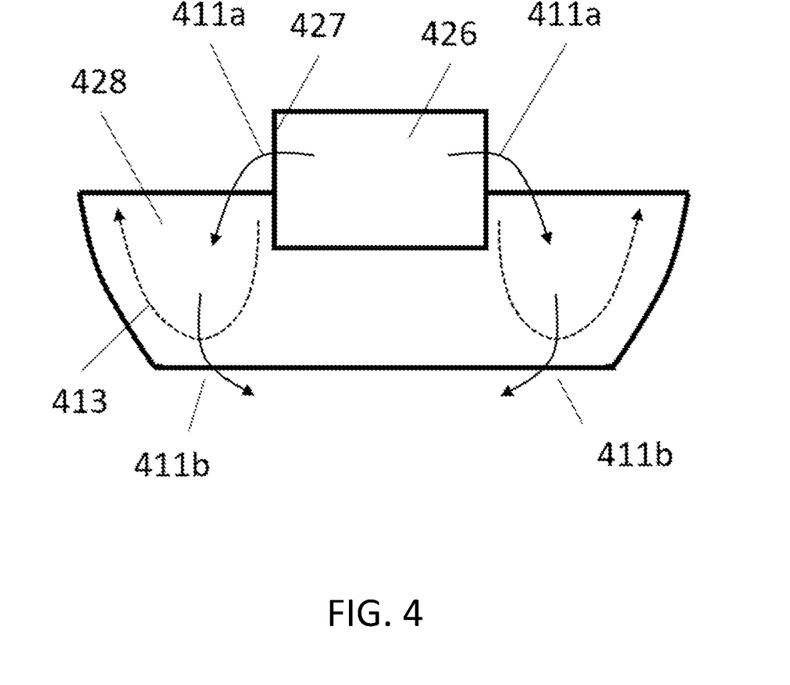
FIG. 4 illustrates an alternative cross-sectional view of a gas separator including liquid fluid and gas circulation patterns.

FIG. 3 further illustrates associated liquid broth flow patterns 311, 311a, 311b, and 311c. The unique configuration of fluid distributor 326 may prevent "short circuiting" as a result of excessive system cross-flow velocities that prevent bubbles from effectively rising against the inclined plates 328. To prevent such a condition, fluid distributor 326, as discussed above, is positioned in fluid contact with the fluid inlet 324 to isolate liquid flow 311, distribute fluid 311a and 311b efficiently over the inclined plates 328, and maintain cross-flow velocities across the entire length of fluid distributor 326. Fluid distributor 326 may be positioned on top and recessed within the inclined plates 328, as shown in FIGS. 3 and 4. In some examples, fluid distributor 326 may be recessed within the inclined plates 328 such that a top portion of the fluid distributor 326 may be positioned above a top of the inclined plates 328. The inclined plates may also be irrigated by fluid 311a and 311b exiting fluid distributor 326 via the orifices in sides of the fluid distributor and or exiting the bottom of fluid distributor via orifices in the bottom of the fluid distributor. This configuration may allow irrigation of different portions of the inclined plates 328 to facilitate an efficient flow of bubbles and liquid. For example, the top of the inclined plates 328 may be irrigated by liquid flow 311a generating from orifices in the sides of fluid distributor 326 which extend over the top portion of fluid distributor inclined plates 328. Lower portions of the inclined plates may be irrigated by liquid 311b exiting the orifices in the sides of fluid distributor 326 located below the top portion of the inclined plates. The bottom of fluid distributor 326 may be positioned or rest generally at the midpoint of the inclined plates 328 as shown in FIG. 4. In some examples, the bottom of fluid distributor 326 may be positioned at the upper one-third portion of inclined plates 328. In yet another example, the bottom of the fluid distributor 326 may be positioned near a bottom one-third portion of inclined plates 328. By regulating the volume of fluid irrigating inclined plates 328 from the liquid flow 311a from fluid distributor 326, fluid distributor it is possible to maintain a constant cross-flow velocity and a constant bubble separation velocity across the inclined plates. Fluid distributor 326 may have a top to control fluid flow and prevent liquid from splashing outside fluid distributor 326. As an alternative optional arrangement, fluid distributor 326 may be configured to irrigate the inclined plates 328 by fluid 311a overflowing over the top of the fluid distributor 326 as opposed to or in addition to through orifices in the sides of fluid distributor 326.

By employing a unique configuration of inclined plates 328 in connection with a unique design of fluid distributor 326, the volume of fluid 311a and 311b irrigating the inclined plates may be regulated efficiently in separator 320 disclosed herein with a significantly decreased volume. For example, the length of the inclined plates 328 may be reduced by decreasing the space between the inclined plates 328 and thus the size of the overall separator vessel 322 may be reduced. The decreased space between the inclined plates 328 allows more plates to be incorporated into the system increasing the overall surface area facilitating bubble rise. Accordingly, the footprint for separator 320 is reduced preserving space and reducing overall costs. In some examples, the volume of fluid from the orifices in the sides of the fluid distributor 326 and below the top of the inclines plates which are used to irrigate the inclined plates 328 may be about 30% of the total fluid volume irrigating the inclined plates 328. According to other examples, the volume of fluid 311b from the orifices in the sides of the fluid distributor 326 and located below the top of the inclined plates used to irrigate the inclined plates 328 may be, for example, at least, greater than, less than, equal to, or any number in between about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 to 100% of the total fluid volume. In still other examples, the volume of fluid 311a used to irrigate the inclined plates 328 via orifices in the sides of fluid distributor 326 and located above the top of inclined plates 328 may be about 70% of the total fluid volume irrigating the inclined plates 328. According to some examples, the volume of fluid 311a used to irrigate the inclined plates 328 via orifices in the sides of fluid distributor 326 located above the top of inclined plates 328 may be, for example, at least, greater than, less than, equal to, or any number in between about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 to 100% of the total fluid volume.

As shown in FIG. 3, inclined plates 328 may be angled in the same general direction. The angled orientation takes advantage of the Boycott Effect. After irrigating the inclined plates 328 with fluid 311a and 311b containing bubbles and liquid broth in a bioreactor, the bubbles rise against inclined plates 328 as a result of the Boycott Effect and the liquid 311c, with bubbles removed, flows to the bottom of separator vessel 322 and is subsequently drained from separator vessel 322 via outlets 334. Outlets 334 provide two locations for liquid such as broth containing microorganism biocatalyst to exit the separator. By configuring the separator with two or more outlets 334, the residence time of microorganisms in substrate-depleted liquid is further minimized by providing liquid 311c shorter distances to travel to exit separator vessel 322. The bubbles that rise to the surface of the liquid are collected as gas at the top portion of separator vessel 322 and is removed from the system via gas outlets 330. In some examples, plurality of inclined plates 328 may be angled from about 45 to about 80 degrees with respect to a horizontal axis. According to one example, the plurality of inclined plates may be angled, for example, at least, greater than, less than, equal to, or any number in between about 5, 10, 15, 20, 25, 30, 35, 40, 45, 50, 55, 60, 65, 70, 75, 80 to 85 degrees with respect to a horizontal axis. In other examples the inclined plates may include a spacing of from about 25 to about 200 mm between individual plates. The orientation of the angle of the inclined plates may be in the direction of the fluid flow from proximate fluid inlet 324 to distal the fluid inlet 324 or against the direction of the fluid flow (as shown in FIG. 3) or a mixture thereof for induvial inclined plates. According to other examples, inclined plates 328 may include a spacing between individual plates of, for example, at least, greater than, less than, equal to, or any number in between about 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295 to 300 mm.

As also shown in FIG. 3, after the fluid 311 has passed over and through plurality of inclined plates 328 and the bubbles have risen against inclined plates 328 to the top of the separator vessel 322, liquid 311c is drained via outlets 334. The liquid may be recirculated via a pump back to the top of the reaction vessel, see FIG. 2. The overall size and volume reduction of separator 320 decreases the time that biocatalyst microorganisms remain in liquid depleted in gas substrate. As the liquid with biocatalyst microorganisms is recirculated back to the reaction vessel, new substrate gas is sparged into the liquid broth providing the needed substrate for the biocatalyst microorganisms and preventing premature increase in no longer viable microbial biomass. Additional gas or liquid inlets or outlets may be incorporated into gas separator 320 (not shown).

As shown in FIG. 4, the unique gas separator configuration incorporating a novel fluid distributor 326 and plurality of inclined plates 328, as disclosed herein, generates an efficient fluid circulation pattern that assists bubbles, and especially small, fine, or micro size bubbles, 413 in rising out of the liquid without interference from the irrigation flow of liquid 311a from fluid distributor 326. By irrigating a portion of inclined plates 328 proximate the walls of fluid distributor 427 with fluid 311a, an outer portion of inclined plate 328, distal to fluid distributor 326, is left largely undisturbed allowing bubbles 413 to rise unimpeded by irrigation fluid 311a, against inclined plate 328. Similarly, by irrigating the inner portion of the inclined plates 328, proximate to the fluid distributor, with fluid 311a exiting the sides of the fluid distributor 326, bubbles 413 may rise unimpeded against an outer portion of inclined plate 328. Liquid flows 311b downward along inclined plates counter to the rising bubbles 413. The efficient circulation of liquid and bubbles allows an expeditious removal of gas from the system fluid reducing the overall volume of separator required and reducing the time biocatalyst microorganisms spend in fluid depleted in substrate.

Figure 5:
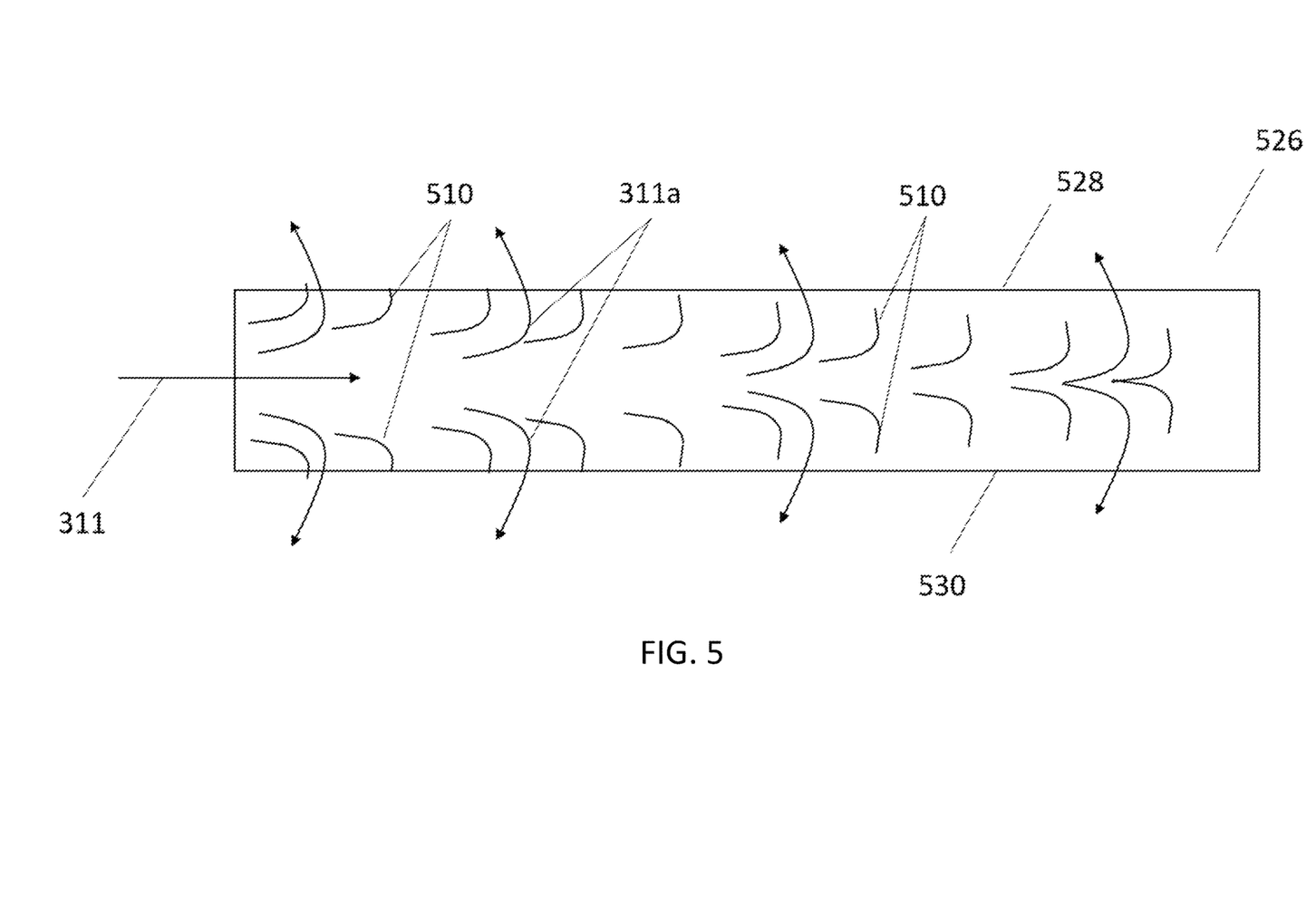
FIG. 5 illustrates an alternate cross-sectional view of a gas separator including liquid fluid circulation patterns.

FIG. 5 shows a cross-sectional top view of fluid distributor 326. Positioned within fluid distributer 326 are a plurality of fluid directing internals 510 to facilitate uniform distribution of fluid along the length of fluid distributor 326 through the orifices in the sides of fluid distributor 326. In one embodiment the fluid directing internals 510 extend from the top to the bottom of fluid distributor 326. Fixing fluid directing internals 510 at the top and bottom of fluid distributor 326, but not at the sides, eliminates obstruction of the orifices in the sides of fluid distributor 5326. Fluid directing internals 510, viewed from the top, may have an at least partially curved shape in order to direct fluid flowing longitudinally through fluid distributor to the orifices in the sides of the fluid distributor. The shape may direct the fluid though a turn ranging from about 70 degrees to about 120 degrees from the longitudinal axis of the fluid distributor. The fluid directing internals extend from an internal portion of the fluid distributor to a side, or proximate to a side of the fluid distributor. The fluid directing internals may be of a uniform size and or shape. In one embodiment, the internals are arranged in pairs with each member of the pair located in parallel to one another; one at or near to a first side 528 of the fluid distributor 326 and a corresponding internal at or near to the second side 530 of the fluid distributor 326. The distance between the two internals of a pair may progressively narrow along the length of the fluid flow distributor so the distance between the two internals of a pair is significantly smaller at the distal end of the fluid flow distributor as compared to at the end proximate to the inlet. As the internals may be of a uniform size, the closer the two internals of a pair are to one another, the further each will be from their respective side of the fluid flow distributor. Uniform size and shape of the internals provides advantages in manufacturing the system, each internal need not be customized for any specific location within the fluid flow distributor. This arrangement provides uniform distribution of fluid flow along the length of the fluid flow distributor. For east of installation the fluid flow distributor and associated internal may be fabricated in multiple segments for assembly at a site. In another embodiment, internals are not aligned in parallel pairs, but instead staggered along the length of the fluid flow distributor. The distance between the fluid directing internals 510 at or near a first side 528 of the fluid distributor 326 and the fluid directing internals 510 at or near a second side 530 of the fluid distributor may decrease along the length of the fluid distributor 326.

Figure 6:
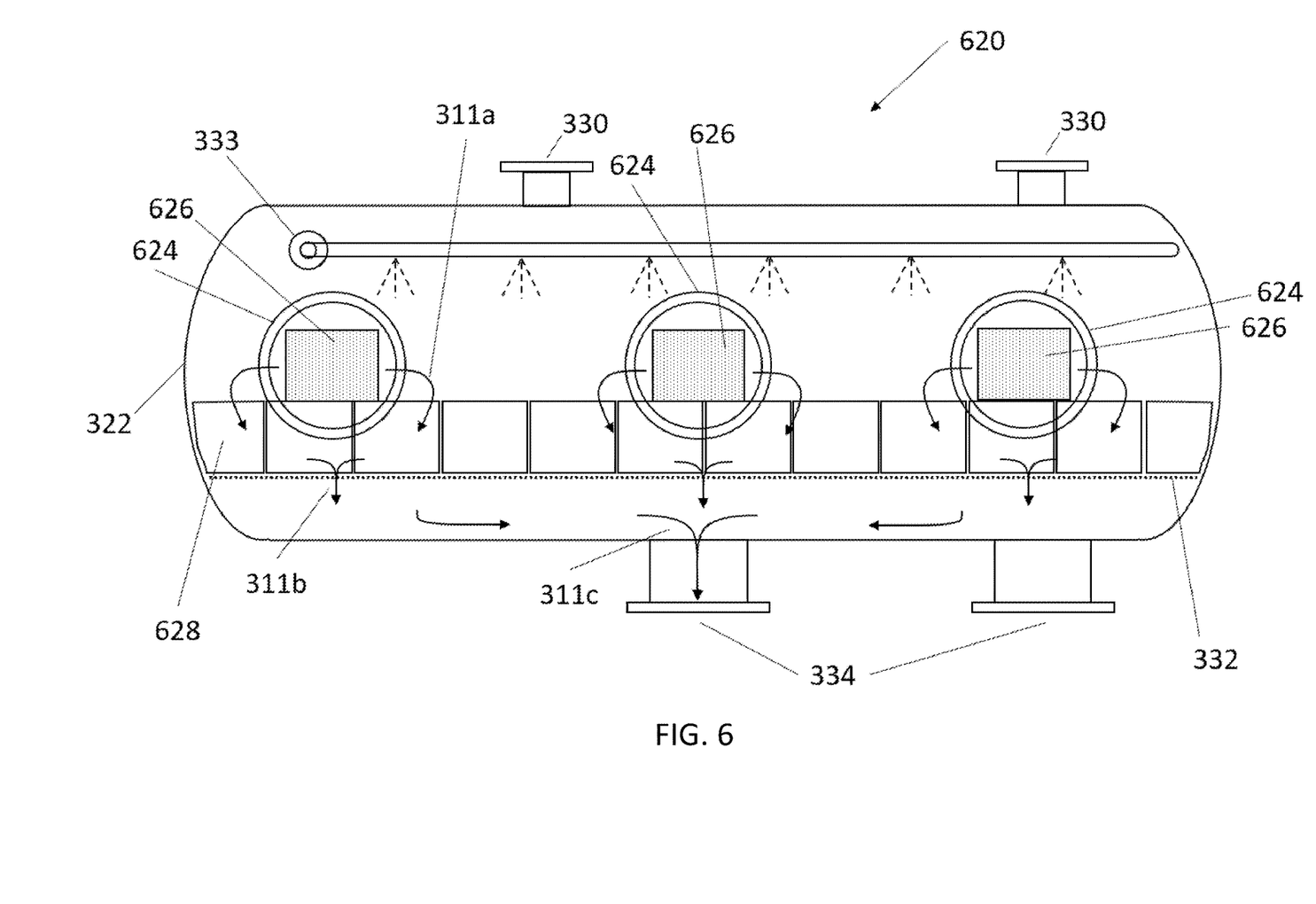
FIG. 6 illustrates a cross-sectional side view of an embodiment of the gas separator and associated liquid fluid flow patterns, according to the systems and methods disclosed herein.

FIG. 6 illustrates a cross-sectional side view of another embodiment of the gas separator and the associated liquid-broth flow pattern of the novel gas separator 620 disclosed herein. In this embodiment, multiple fluid inlets 624 and multiple fluid distributors 626 are employed. FIG. 6 depicts an exemplary set of three fluid inlets and fluid distributors, and additional embodiments may employ two, four, five, six or more sets of fluid inlets and fluid distributors. The multiple sets of fluid inlets and fluid distributors may be orientated parallel to the longitudinal axis of separator vessel 322 or may be orientated perpendicular to the longitudinal axis of the separator vessel 322. FIG. 6 depicts the embodiment where three sets of fluid inlets and fluid distributors are orientated perpendicular to the longitudinal axis of separator vessel 322, which is cylindrical in shape and positioned generally horizontally. Similarly, FIG. 6 illustrates inclined plates 628 orientated within separator vessel 322 to coordinate with the sets of fluid inlets and fluid distributors. In FIG. 6, inclined plates 628 have a top edge and bottom edge parallel to the longitudinal axis of separator vessel 322. The embodiment of FIG. 6 is particularly useful when, due the length of the separator vessel, additional support structure would be needed to support a fluid distributor that ran the length of the separator vessel. By orientating the fluid distributors to span the cross-section or width of the separator vessel, additional support structure may be avoided.

Figure 7:
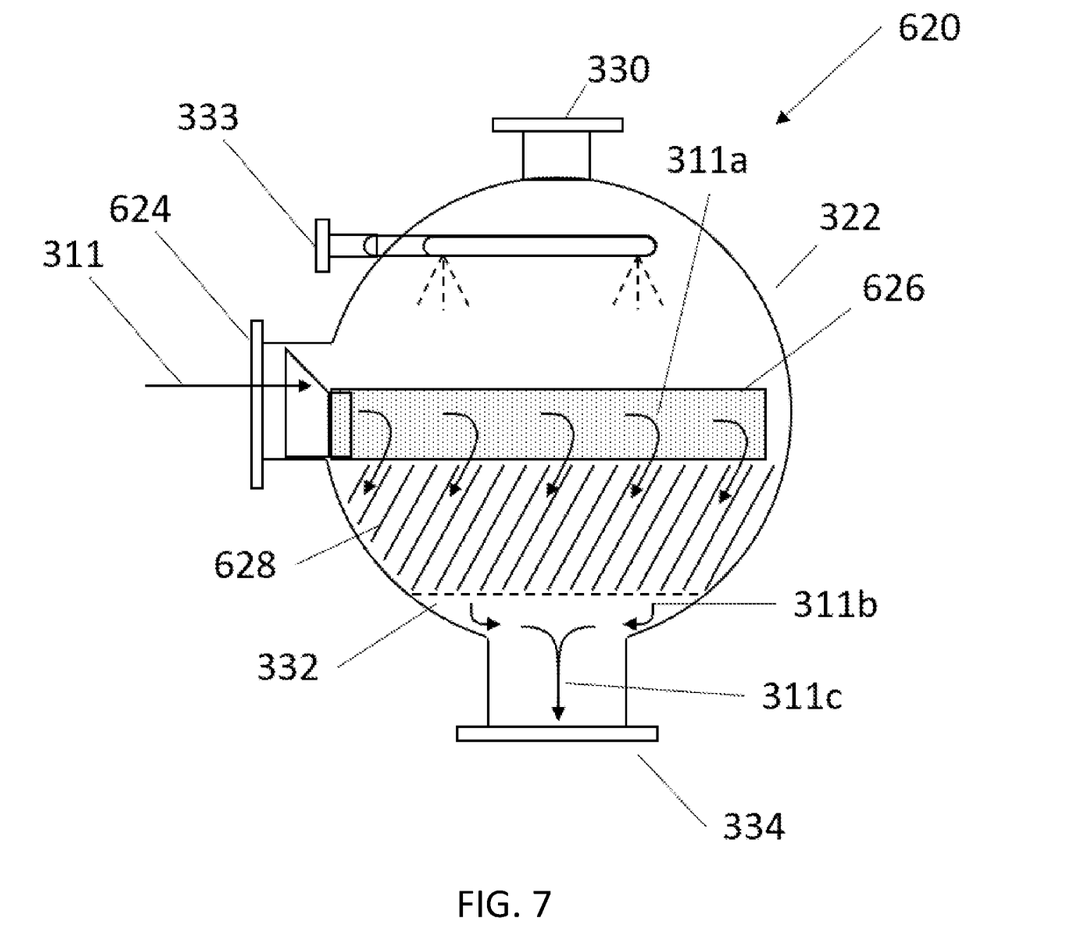
FIG. 7 illustrates an alternate cross-sectional end view of an embodiment of the gas separator and associated liquid fluid flow patterns, according to the systems and methods disclosed herein.

FIG. 7 illustrates a cross-sectional end view of the embodiment of FIG. 6. In this embodiment, multiple fluid inlets 624 and multiple fluid distributors 626 are employed. FIG. 7 clearly depicts the inclined plates 628 orientated within separator vessel 322 to coordinate with the sets of fluid inlets and fluid distributors by having a top edge and bottom edge parallel to the longitudinal axis of separator vessel 322.

Figure 8:
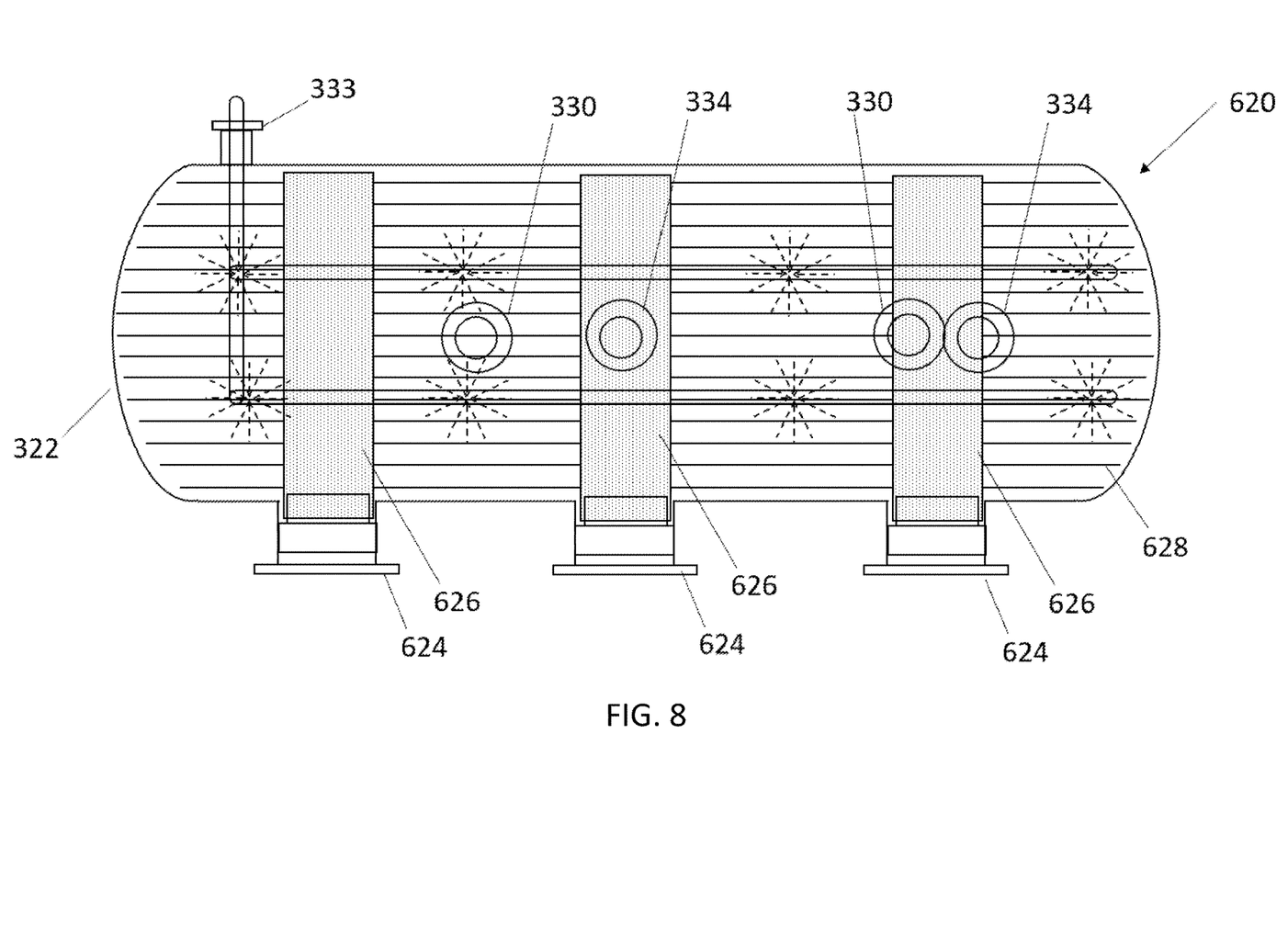
FIG. 8 illustrates an alternate cross-sectional top view of an embodiment of the gas separator according to the systems and methods disclosed herein.

FIG. 8 illustrates a cross-sectional top view of the embodiment of FIG. 6. In this embodiment, multiple fluid inlets 624 and multiple fluid distributors 626 are employed. FIG. 8 clearly depicts fluid distributors 626 orientated to span the cross-section or width of separator vessel 322. FIG. 8 further shows a sprayer system 333 having multiple sprayers dispersed over the area of separator vessel 322.

Reference numbers in FIG. 6, FIG. 7, and FIG. 8 remaining the same as compared to FIG. 3 are as described with reference to FIG. 3.

The gas separator system disclosed herein may integrate in or with various reactor systems, for example, as described in U.S. Pat. No. 9,327,251, U.S. patent application Ser. No. 17/453,476 filed Nov. 3, 2021, and U.S. Patent Application No. 63/263,507 filed Nov. 2, 2021, each of which is incorporated herein by reference in its entirety for all purposes. The bioreactor system may include a reaction vessel for containing fluids that comprise a biocatalyst microorganism, the liquid microbial growth medium, waste/inert gases, and gas substrate. In some examples, the reaction vessel may employ multiple liquid jets, generated by a perforated plate that accelerates the liquid broth to break substrate bubbles into smaller substrate bubbles. The resulting fluid broth flows down the reaction vessel in the downward fluid flow. Other embodiments employ an upward flow in the reactor vessel.

In some examples, the substrate bubbles may be a C1-carbon source that the system biocatalyst microorganism ferment, producing a useful fermentation product and waste gas. The substrate and/or C1-carbon source may be a waste gas obtained as a by-product of an industrial process or from another source, such as combustion engine exhaust fumes, biogas, landfill gas, direct air capture, or from electrolysis. The substrate and/or C1-carbon source may be syngas generated by pyrolysis, torrefaction, or gasification. In other words, carbon in waste material may be recycled by pyrolysis, torrefaction, or gasification to generate syngas which is used as the substrate and/or C1-carbon source. The substrate and/or C1-carbon source may be a gas comprising methane, and in certain embodiments the substrate and/or C1-carbon source may be a non-waste gas.

In certain embodiments, the industrial process is selected from ferrous metal products manufacturing, such as a steel manufacturing, non-ferrous products manufacturing, petroleum refining, electric power production, carbon black production, paper and pulp manufacturing, ammonia production, methanol production, coke manufacturing, petrochemical production, carbohydrate fermentation, cement making, aerobic digestion, anaerobic digestion, catalytic processes, natural gas extraction, cellulosic fermentation, oil extraction, industrial processing of geological reservoirs, processing fossil resources such as natural gas coal and oil, landfill operations, or any combination thereof. Examples of specific processing steps within an industrial process include catalyst regeneration, fluid catalyst cracking, and catalyst regeneration. Air separation and direct air capture are other suitable industrial processes. Specific examples in steel and ferroalloy manufacturing include blast furnace gas, basic oxygen furnace gas, coke oven gas, direct reduction of iron furnace top-gas, and residual gas from smelting iron. Other general examples include flue gas from fired boilers and fired heaters, such as natural gas, oil, or coal fired boilers or heaters, and gas turbine exhaust. In these embodiments, the substrate and/or C1-carbon source may be captured from the industrial process before it is emitted into the atmosphere, using any known method.

The substrate and/or C1-carbon source may be synthesis gas known as syngas, which may be obtained from reforming, partial oxidation, plasma, or gasification processes. Examples of gasification processes include gasification of coal, gasification of refinery residues, gasification of petroleum coke, gasification of biomass, gasification of lignocellulosic material, gasification of waste wood, gasification of black liquor, gasification of municipal solid waste, gasification of municipal liquid waste, gasification of industrial solid waste, gasification of industrial liquid waste, gasification of refuse derived fuel, gasification of sewerage, gasification of sewerage sludge, gasification of sludge from wastewater treatment, gasification of landfill gas, gasification of biogas such as when biogas is added to enhance gasification of another material. Examples of reforming processes include, steam methane reforming, steam naphtha reforming, reforming of natural gas, reforming of biogas, reforming of landfill gas, reforming of coke oven gas, reforming of pyrolysis off-gas, reforming of ethylene production off-gas, naphtha reforming, and dry methane reforming. Examples of partial oxidation processes include thermal and catalytic partial oxidation processes, catalytic partial oxidation of natural gas, partial oxidation of hydrocarbons, partial oxidation of biogas, partial oxidation of landfill gas, or partial oxidation of pyrolysis off-gas. Examples of municipal solid waste include tires, plastics, refuse derived fuel, and fibers such as in shoes, apparel, and textiles. Municipal solid waste may be simply landfill-type waste and may be sorted or unsorted. Examples of biomass may include lignocellulosic material and microbial biomass. Lignocellulosic material may include agriculture waste and forest waste.

The substrate and/or C1-carbon source may be a gas stream comprising methane. Such a methane containing gas may be obtained from: fossil methane emissions such as during fracking, wastewater treatment, livestock, agriculture, and municipal solid waste landfills. It is also envisioned that the methane may be burned to produce electricity or heat and the C1 by-products may be used as the substrate or carbon source. In yet other examples, the substrate may further comprise other non-carbon components, such as $H_2$ or $N_2$.

The biocatalyst microorganism in the bioreactor system broth may ferment the C1-carbon source and generate one or more products such as ethanol, acetate, 1-butanol, butyrate, 2,3-butanediol, lactate, butene, ethylene, butadiene, methyl ethyl ketone (MEK), acetone, isopropanol, lipids, 3-hydroxypropionate, terpenes, including isoprene, fatty acids, 2-butanol, 1,2-propanediol, 1 propanol, 1-hexanol, 1-octanol, chorismate-derived products, 3 hydroxybutyrate, 1,3 butanediol, 2-hydroxyisobutyrate or 2-hydroxyisobutyric acid, isobutylene, adipic acid, 1,3 hexanediol, 3-methyl-2-butanol, 2-buten-1-ol, isovalerate, isoamyl alcohol, monoethylene glycol, or combinations thereof. In certain examples, microbial biomass itself may be considered a product and may be further processed to produce at least a portion a of protein source such as in animal feed. One or more of these products may be further converted to produce other products such as at least one component of diesel, aviation fuel, gasoline, polymeric products and or precursors, ingredients or components of consumer products or industrial materials.

Although the present disclosure has been described in certain specific embodiments, many additional modifications and variations would be apparent to those skilled in the art. It is therefore to be understood that the present disclosure may be practiced otherwise than specifically described without departing from the scope and spirit of the present disclosure. Thus, embodiments of the present disclosure should be considered in all respects as illustrative and not restrictive. Accordingly, the scope of the disclosure should be determined not by the embodiments illustrated, but by the appended claims and their equivalents. All references, including publications, patent applications, and patents, cited herein are hereby incorporated by reference in their entirety as if each reference were individually and specifically indicated to be incorporated by reference in their entirety and were set forth in its entirety herein. All temperatures herein are provided in degrees Celsius unless otherwise stated and all parts and percentages are by weight unless otherwise stated.

The disclosure is described below in connection with specific embodiments which are intended to illustrate and not limit the scope of the description and claims.

A first embodiment of the disclosure is a system for separating gas from a liquid comprising: a separator vessel; at least one fluid inlet engaged with the separator vessel; at least one gas outlet engaged with the separator vessel; at least one liquid outlet engaged with the separator vessel; a plurality of inclined plates positioned within the separator vessel; and at least one fluid distributor positioned within the separator vessel and engaged with the plurality of inclined plates, the fluid distributor further comprising a first end proximate to the fluid inlet, and a second end distal to the fluid inlet. An embodiment of the disclosure is one, any, or all of the embodiments recited in this paragraph, wherein the fluid distributor further comprises a plurality of orifices positioned on two sides of the fluid distributor. An embodiment of the disclosure is one, any, or all of the embodiments recited in this paragraph, wherein the fluid distributor further comprises a plurality of fluid directing internals housed within the fluid distributor. An embodiment of the disclosure is one, any, or all of the embodiments recited in this paragraph, wherein the fluid distributor further comprises a rectangular-shaped cross-section. An embodiment of the disclosure is one, any, or all of the embodiments recited in this paragraph, wherein the fluid distributor further comprises an upper portion positioned above a top of the plurality of inclined plates, and a lower portion positioned above a bottom portion of the plurality of inclined plates. An embodiment of the disclosure is one, any, or all of the embodiments recited in this paragraph, wherein the separator vessel is cylindrical. An embodiment of the disclosure is one, any, or all of the embodiments recited in this paragraph, wherein the cylindrical separator vessel is oriented in a horizontal plane. An embodiment of the disclosure is one, any, or all of the embodiments recited in this paragraph, wherein the cylindrical separator vessel is in fluid communication with a reaction vessel and positioned above at least a bottom one-third portion of the reaction vessel. An embodiment of the disclosure is one, any, or all of the embodiments recited in this paragraph, wherein, the plurality of inclined plates further comprises a spacing of about 25 mm to 200 mm between individual plates. An embodiment of the disclosure is one, any, or all of the embodiments recited in this paragraph, wherein the plurality of inclined plates is angled from about 45 degrees to about 80 degrees with respect to a horizontal axis. An embodiment of the disclosure is one, any, or all of the embodiments recited in this paragraph, wherein, the inclined plates have bottom portions which engage a perforated plate. An embodiment of the disclosure is one, any, or all of the embodiments recited in this paragraph, wherein the fluid inlet is positioned at an end of the cylindrical separator vessel. An embodiment of the disclosure is one, any, or all of the embodiments recited in this paragraph, wherein the fluid inlet is positioned along the length of the cylindrical separator vessel. An embodiment of the disclosure is one, any, or all of the embodiments recited in this paragraph, wherein at least two fluid inlets are positioned along the length of the cylindrical separator vessel and wherein the system comprises at least two fluid distributors. An embodiment of the disclosure is one, any, or all of the embodiments recited in this paragraph, the system further comprising at least one sprayer system positioned within the separator vessel A second embodiment of the disclosure is a method of separating gas from a liquid comprising: feeding a fluid comprising liquid and gas into an inlet of a separator vessel; channeling the fluid from the inlet into at least one fluid distributor positioned within the separator vessel; directing the fluid within the fluid distributor and uniformly irrigating, through orifices in the fluid distributor, a plurality of inclined plates positioned within the separator vessel and along a length of the fluid distributor; allowing the gas to rise against the plurality of inclined plates; draining the liquid through at least one liquid outlet; and removing the gas through at least one gas outlet. An embodiment of the disclosure is one, any, or all of the embodiments recited in this paragraph, further comprising pressurizing the separator vessel, wherein the separator vessel is cylindrical. An embodiment of the disclosure is one, any, or all of the embodiments recited in this paragraph, further comprising positioning the cylindrical separator vessel in a horizontal plane. An embodiment of the disclosure is one, any, or all of the embodiments recited in this paragraph, wherein the uniformly irrigating the plurality of inclined plate comprises passing the fluid though a plurality of orifices positioned on the sides, a bottom, or both of the fluid distributor. An embodiment of the disclosure is one, any, or all of the embodiments recited in this paragraph, wherein a first volume of fluid passes through orifices located above a top of the plurality of inclined plates and a second volume of fluid passes through orifices located below the top of the inclined plates. An embodiment of the disclosure is one, any, or all of the embodiments recited in this paragraph, wherein the first volume of fluid irrigating the plurality of inclined plates comprises about 30% of a total liquid volume, and the second volume of fluid irrigating the plurality of inclined plates comprises about 70% of the total liquid volume. An embodiment of the disclosure is one, any, or all of the embodiments recited in this paragraph, further comprising maintaining a constant cross-flow velocity and a constant bubble separation velocity across the plurality of inclined plates. An embodiment of the disclosure is one, any, or all of the embodiments recited in this paragraph, further comprising recirculating the drained liquid to a reactor.

A third embodiment of the disclosure is a bioreactor system comprising: a reaction vessel comprising: a fluid, the fluid comprising a liquid growth medium, gas substrate comprising at least one C1 carbon source, a waste gas, and a culture of at least one microorganism in the liquid growth medium, wherein the culture of at least one microorganism ferments the gas substrate to produce at least one fermentation product and the waste gas; a gas separator vessel in fluid communication with the reaction vessel and positioned above a bottom one-third portion of the reactor vessel, the gas separator comprising: at least one fluid inlet in fluid communication with the reaction vessel; at least one gas outlet; at least one liquid outlet; a plurality of inclined plates positioned within the gas separator vessel; and at least one fluid distributor engaged with the plurality of inclined plates; and a pump configured to recirculate liquid comprising the liquid growth medium and the culture of at least one microorganism from the gas separator vessel to the reaction vessel, wherein the system is pressurized and wherein the system lacks a throttling valve between the reaction vessel and the gas separator vessel fluid inlet.

The invention claimed is:

1. A method of separating gas from a liquid comprising:
   feeding a fluid comprising liquid and gas into at least one inlet of a separator vessel;
   channeling the fluid from the inlet into a fluid distributor positioned within the separator vessel;
   directing the fluid within the fluid distributor and uniformly irrigating, through orifices in the fluid distributor, a plurality of inclined plates positioned within the separator vessel and along a length of the fluid distributor;
   allowing the gas to rise against the plurality of inclined plates;
   draining the liquid through at least one liquid outlet; and
   removing the gas through at least one gas outlet.

2. The method of claim 1, further comprising pressurizing the separator vessel, wherein the separator vessel is cylindrical.

3. The method of claim 2, further comprising positioning the cylindrical separator vessel in a horizontal plane.

4. The method of claim 1, wherein the uniformly irrigating the plurality of inclined plate comprises passing the fluid though a plurality of orifices positioned on the sides, a bottom, or both of the fluid distributor.

5. The method of claim 4, wherein a first volume of fluid passes through orifices located above a top of the plurality of inclined plates and a second volume of fluid passes through orifices located below the top of the inclined plates.

6. The method of claim 5, wherein the first volume of fluid irrigating the plurality of inclined plates comprises about 30% of a total liquid volume, and the second volume of fluid irrigating the plurality of inclined plates comprises about 70% of the total liquid volume.

7. The method of claim 1, further comprising maintaining a constant cross-flow velocity and a constant bubble separation velocity across the plurality of inclined plates.

8. The method of claim 1, further comprising recirculating the drained liquid to a reactor.

* * * * *